United States Patent [19]

Rusin

[11] Patent Number: 4,842,233

[45] Date of Patent: Jun. 27, 1989

[54] LIFTING MECHANISM

[75] Inventor: Mark M. Rusin, Napa, Calif.

[73] Assignee: Dexta Corporation, Napa, Calif.

[21] Appl. No.: 119,734

[22] Filed: Nov. 12, 1987

[51] Int. Cl.⁴ .......... F16M 13/00

[52] U.S. Cl. .......... 248/405; 248/669; 74/89.15; 74/110; 74/89.21; 108/147; 297/348

[58] Field of Search .......... 248/669, 161, 404, 405, 248/157, 188.4; 108/147, 20; 297/330, 348; 74/89.15, 424.8 R, 110, 89.21

[56] References Cited

U.S. PATENT DOCUMENTS

| | | | |
|---|---|---|---|
| 1,694,243 | 12/1928 | Wilford | 248/404 |
| 2,678,859 | 5/1954 | Zuzzi | 248/405 |
| 3,210,846 | 10/1965 | Balkin | 108/147 |
| 3,805,629 | 4/1974 | Martin | 74/89.15 |
| 3,894,601 | 7/1975 | Gestring | 297/348 |
| 4,134,689 | 1/1979 | Ahrenskou-Sorensen | 108/147 |
| 4,557,454 | 12/1985 | Urella | 248/669 |
| 4,577,827 | 3/1986 | Eliscu | 248/662 |
| 4,635,492 | 1/1987 | Uebelhart | 74/89.15 |
| 4,682,930 | 7/1987 | Hachisu | 74/89.15 |

FOREIGN PATENT DOCUMENTS

| | | | |
|---|---|---|---|
| 2301305 | 7/1973 | Fed. Rep. of Germany | 108/20 |
| 2309970 | 11/1973 | Fed. Rep. of Germany | 297/330 |
| 303985 | 12/1954 | Switzerland | 297/348 |
| 225214 | 3/1926 | United Kingdom | 297/348 |

*Primary Examiner*—J. Franklin Foss
*Assistant Examiner*—Robert A. Olson
*Attorney, Agent, or Firm*—Ellsworth R. Roston; Charles H. Schwartz

[57] ABSTRACT

A lifting mechanism provides double action movement of a ram member supported on a platform along a particular axis between a first lower position and a second higher position. The lifting mechanism includes the following: A motor having a drive shaft extending along an axis. At least one axial drive member is coupled to the platform to provide axial movement of the platform along the particular axis. Gear means is coupled to the drive shaft and the axial drive member to translate the rotary motion of the drive shaft about the perpendicular axis to motion of the axial drive member along the particular axis to provide the axial movement of the platform. A movable ram member is supported on the platfrom and is moveable relative to the platform along the particular axis so that axial movement of the platfrom provides simultaneous movement of the ram member along the particular axis to produce the double action movement of the ram member upon rotation of the motor.

23 Claims, 3 Drawing Sheets

FIG. 1
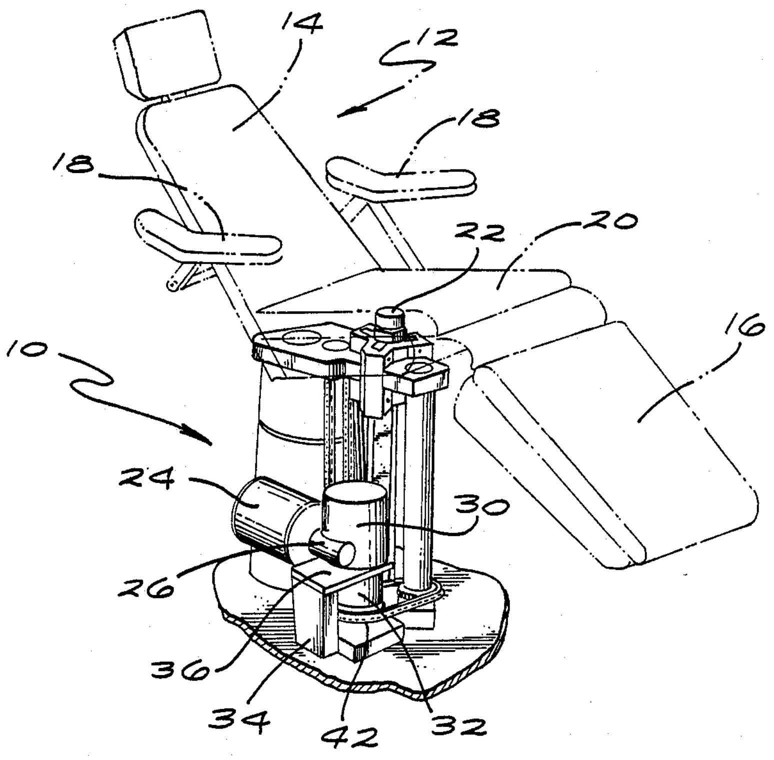
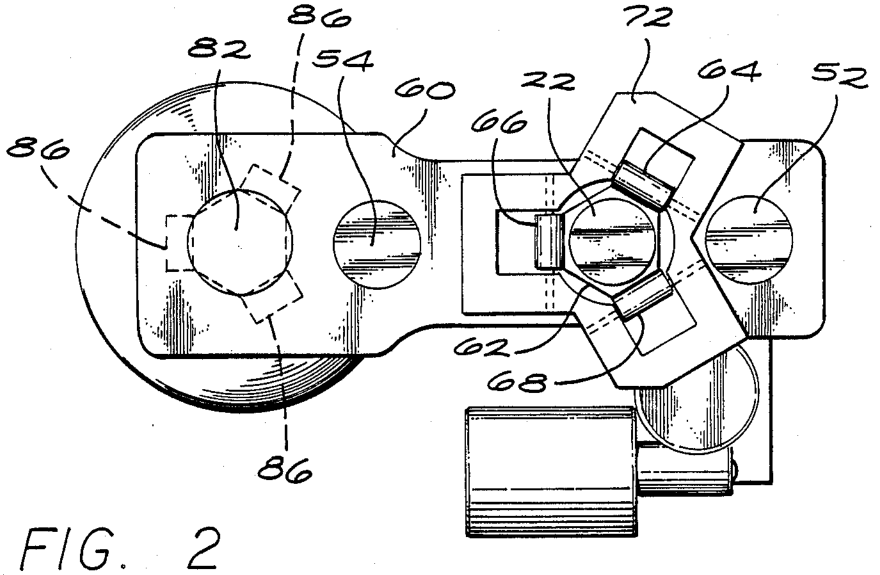
FIG. 2

LIFTING MECHANISM

BACKGROUND OF THE INVENTION

1. Field of the Invention

The present invention relates to a lifting mechanism for a device such as a dental chair. More specifically, the invention relates to a lifting mechanism which is adjustable in height within a relatively large height range and with this adjustability accomplished rapidly while still maintaining stability for the lifting mechanism. It should be appreciated that although the invention is described with reference to lifting a dental chair, such lifting mechanisms have other uses in a wide variety of fields other than dentistry.

2. Background of the Prior Art

Many occupations and professions such as dentistry require the subject, such as the patient to be maneuvered to various height positions while the subject is either in a sitting or reclining position. In the early days, this was accomplished manually through various types of mechanical assemblies to provide for the lifting operation. In more modern times, the manual assemblies have been replaced by power assemblies including but not limited to motor drive systems and hydraulic systems. The present invention relates to a motor driven lifting mechanism which is substantial improvement over the prior art lifting mechanisms.

In the prior art systems, the orientation of the motor provides for a limited travel of the lifting mechanism to thereby reduce the overall height adjustment of the chair. In addition, a number of the prior art systems do not provide for adequate stability, especially with the lifting mechanism extended in the maximum upward direction. The present invention is, therefore, directed to a lifting mechanism for an adjustable chair such as a dental chair which has an extended travel which travel can occur rapidly and with the stability of the system enhanced throught the entire travel.

SUMMARY OF THE INVENTION

The lifting mechanism of the present invention includes a drive motor having a drive shaft extending in a direction perpendicular to the direction of travel for the lifting mechanism. The drive motor is coupled to a gear box and with the gear box positioned in a direction to produce a maximum lifting distance for the lifting mechanism. Specifically, the gear box is positioned to produce a drive of a pair of drive screws and with the drive provided at a bottom position for the screws so that each screw in association with a tubular follower, producing a maximum travel distance.

The pair of screws are provided to increase the stability and insure the proper support for a plate member or platform which platform has attached thereto a moveable ram member. The movement of the ram member is coordinated with the movement of the pair of screw members so that as the screw members are actuated to produce movement of the platform, the ram member is also actuated to produce a double acting effect to provide for a double movement of the ram member in accordance with a single drive motion of the drive motor.

The seat or surface for supporting the subject is mounted at the top of the ram member so that the seat may be rapidly lifted or lowered upon actuation of the drive motor. As a final member in the assembly of the lifting mechanism, a second ram member may be moveable coupled to the platform to provide for additional stability in the lifting mechanism of the present invention.

The present invention, therefore, provides for a drive motor positioned perpendicular to the direction of travel to increase the travel distance for the lifting mechanism and with the lifting mechanism including dual screws and dual rams to enhance the stability. The total combination provide for a stable lifting mechanism having both a rapid travel and a large travel distance when compared with the prior art devices.

A BRIEF DESCRIPTION OF THE DRAWINGS

A clearer understanding of the present invention will be had with reference to the following description and drawings wherein:

FIG. 1 illustrates a perspective view of a power driven lifting mechanism of the present invention showing support of in a chair such as a dentist chair;

FIG. 2 is a top view of the lifting mechanism of FIG. 1;

DETAILED DESCRIPTION OF THE PREFERRED EMBODIMENT

Figure 3:
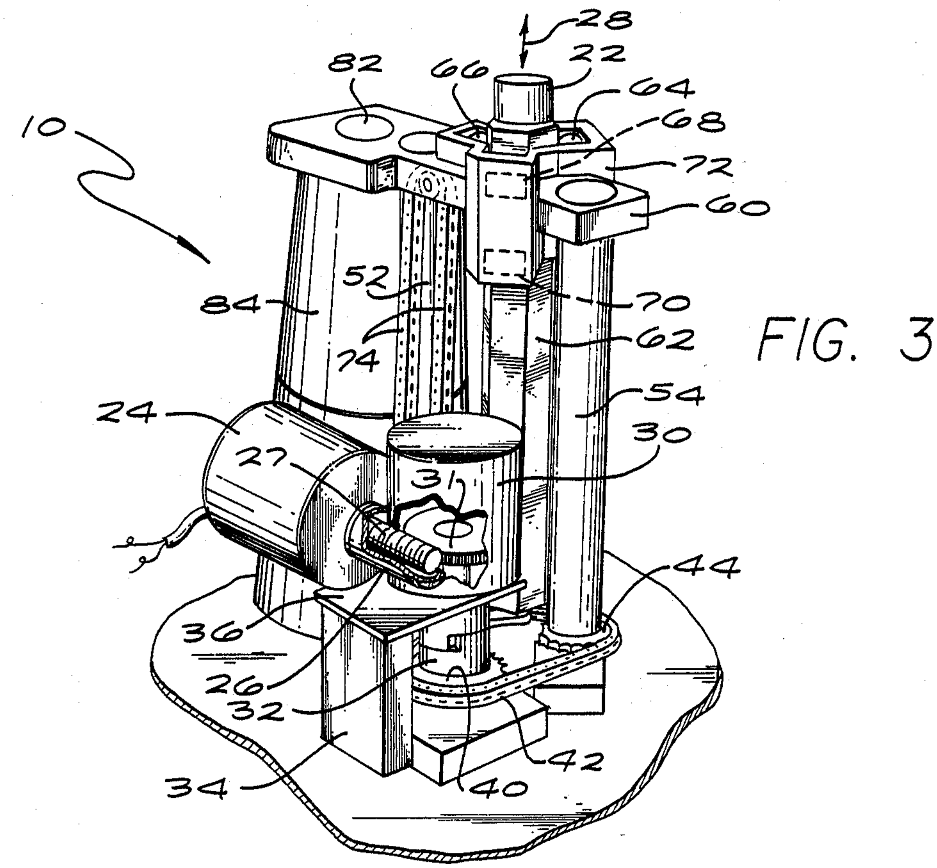
FIG. 3 is a perspective view of the lifting mechanism similar to FIG. 1, but in larger size.

As shown in FIG. 1, a power driven lifting mechanism 10 may support a structure such as an adjustable chair 12. The chair 12 may be of any common type and provides for adjustments such as the angle of the back portion 14, the angle of a foot portion 16, adjustment of arm rests 18 and rotation of a seat portion 20 about a pivot surface 22 shown to be the top surface of a ram member.

With reference to FIGS. 1 and 3, the lifting mechanism 10 includes a motor 24. The motor is mounted to have a drive shaft 26 extend in a horizontal direction along an axis perpendicular to the particular axis which defines the direction of travel as shown by the arrow 28 in FIG. 3. The arrow 28 represents the movement of the portion 22 which serves as the support for the chair 12. The drive shaft 26 includes a threaded member which engages a gear box 30 and specifically a gear 31. The gear box may be of a known type to provide for a gear reduction for the speed of the motor down to a lower speed for a shaft member 32 extending from the gear box 30. The gear box may also provide for a change in direction of rotation for the shaft member 32 or the motor 24 itself may be reversible. Both the motor 24 and gear box 30 are shown schematically to be mounted by a mounting structure formed by a vertical support 34 and horizontal support 36.

Figure 4:
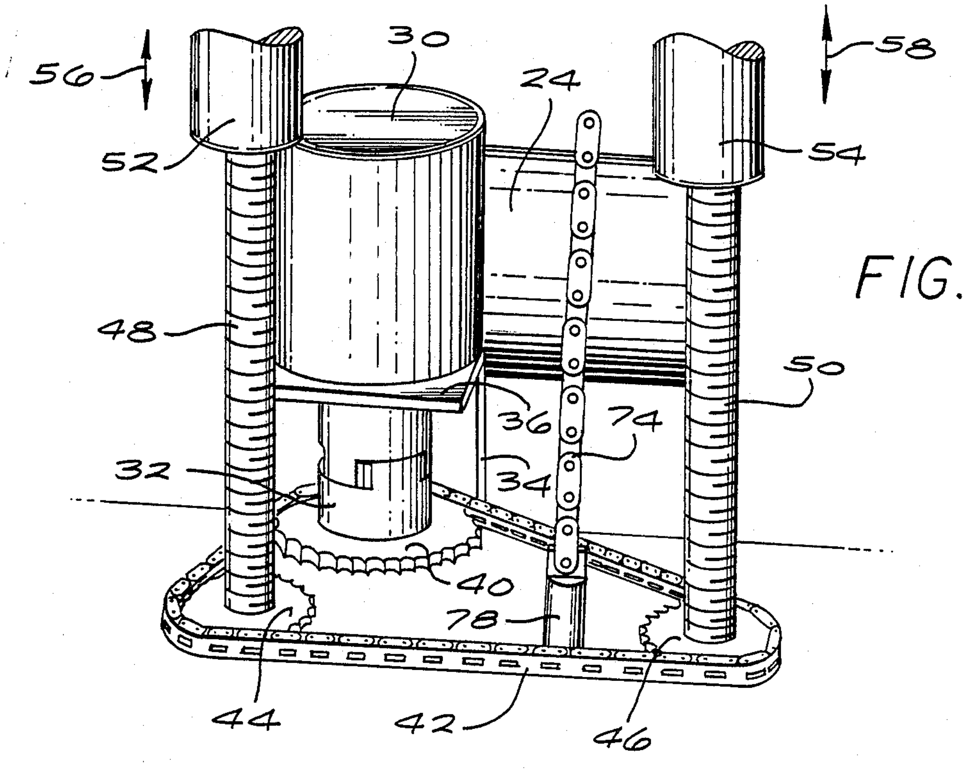
FIG. 4 is a perspective view from the side opposite to that shown in FIGS. 1 and 3 and specifically illustrating the lower drive structure.

Referring now to FIG. 4, it can be seen that the lower shaft portion 32 of the gear box 30 supports a pulley 40 formed as a toothed wheel which pulley 40 engages a belt 42 formed as a chain. It can specifically be seen that the belt 42 and pulley 40 may be similar to a bicycle chain and pulley of the type commonly used. The belt and pulley, however, may be of any common type. For example, the belt may be constructed of metal links as shown, or may be a toothed belt or may be a friction belt or any other similar structure. The pulley 40 may be a toothed wheel as shown or may be a friction wheel so long as the combination provides for a positive engagement and movement of the belt 42 upon rotation of the pulley 40.

The belt 42 extends around the pulley 40 and additionally around pulley members 44 and 46 also formed as toothed wheels. Pulley members 44 and 46 are actually located at and coupled to the bottom of the screw members 48 and 50. Associated with each screw member is a follower formed as tubular members 52 and 54 having internal threads cooperating with the external threads of the screw members 48 and 50. Again, this structure may also take other forms such as a ball screw actuator and the invention is not to be limited to the specific screw and tubular followers shown in the present invention. In any event, as the belt 42 is moved by the pulley 40, so too are the pulleys 44 and 46. This in turn provides rotation of the screws 48 and 50 to thereby produce upward or downward motion of the followers 52 and 54, as shown by the arrows 56 and 58. Both followers 52 and 54 are actuated at the same time in unison and this double screw arrangement thereby provides for stability in the lifting mechanism.

Figure 5:
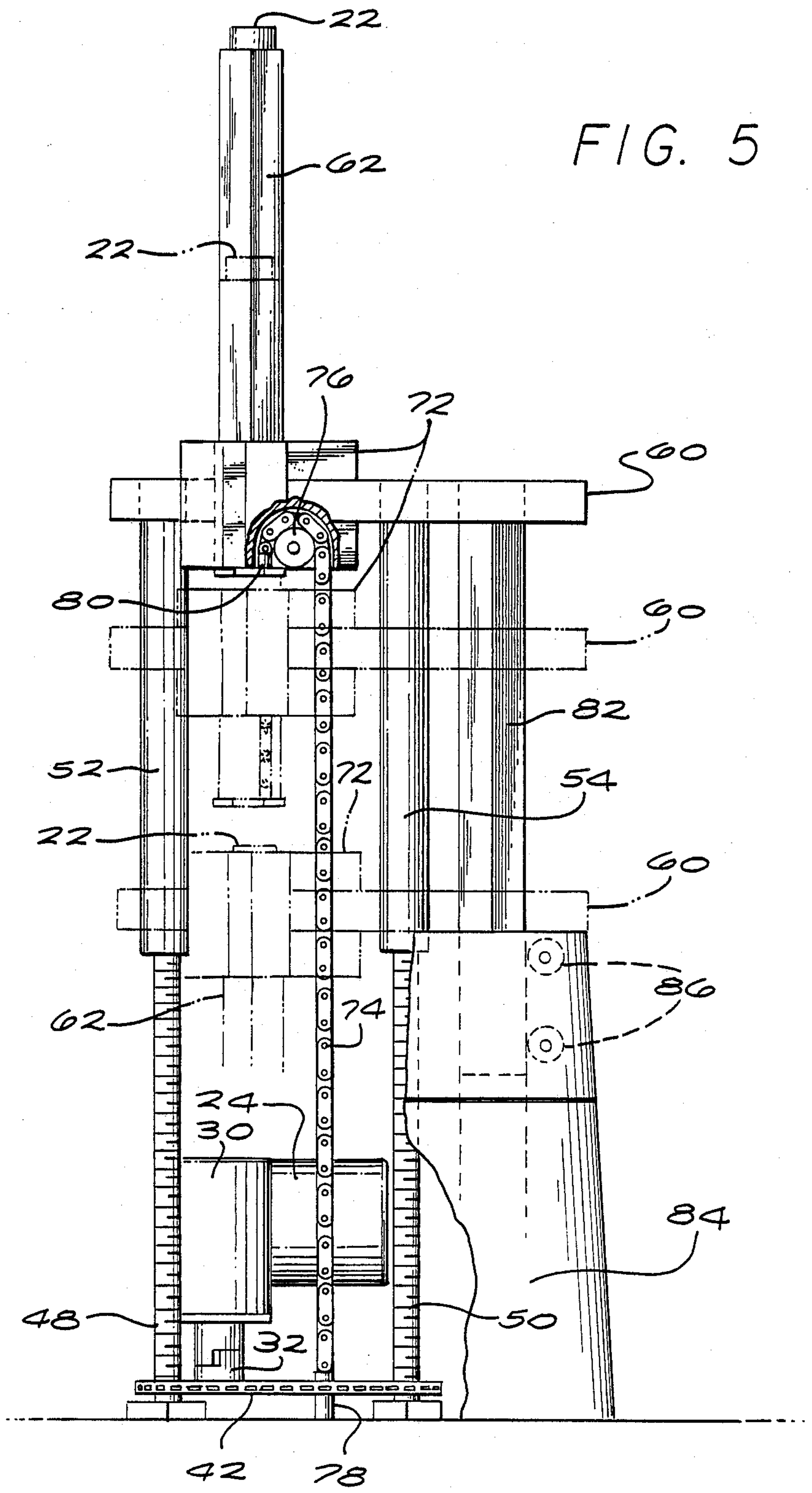
FIG. 5 is a view from the same side as FIG. 4 and showing in more detail the double action operation and the use of second ram for stability.

The top of the followers 52 and 54 are secured within a top plate or platform 60 and the top plate 60 itself serves as an intermediate lifting platform and support for a further ram actuator 62. The top portion 22 of the ram 62 serves as the support and pivot surface for the chair 12 as shown in FIG. 1. As shown in FIGS. 3 and 5, the ram 62 has a exagonal outer surface. This provides for flat bearing surfaces during upward and downward movement of the ram 62 as shown by arrow 28 in FIG. 3.

Specifically, as shown in the top view of FIG. 2, upper bearing members 64, 66 and 68 press against three of the hexagonal side surfaces of the ram member 62 to provide for firm support of the ram member 62 as the ram member is moved upward and downward relative to the platform 60. The upper bearing members 64, 66 and 68 serve as upper bearing structures and with lower bearing members shown in dotted line in FIG. 3 as exemplified by the lower bearing member 70. All of these bearing structures may be rotary in nature to enhance the movement of the ram member 62 and with all of these bearing members being supported within a housing 72 which is affixed to the platform 60.

In order to provide for the axial movement of the ram member 62, a further belt 74 and pulley 76 are used. This may be seen with reference to FIG. 5. The belt 74, which may be formed as a chain is affixed at one end to a lower support member 78 shown in FIGS. 4 and 5. The other end of the belt 74 is affixed to the ram member 62 by an upper support member 80. The belt 74 extends around the pulley 76 and with the pulley 76 pivoted within the housing 72 supported by the platform 60. The pulley 76 may be a toothed wheel. Movement of the platform 60 thereby provides for a coordinated movement of the ram 62 in an upper or lower direction because of the rotation of the belt 74 over the pulley 76.

For example, as shown in FIG. 2, the entire lifting mechanism is shown in its lower most position and with the belt 74 extending in an inverted U-shape configuration. This also be seen in FIG. 5 in the lowest dotted position for the platform 60 wherein the belt extends around the pulley and is doubled back on itself to have the ram 62 in its lowest position. As the screw members 48 and 50 are actuated by the motor 24 through the gear box 30, the platform 60 is lifted. At this time the belt 74 is rotated around the pulley 76 thereby lengthening the belt on one side and shortening the belt on the other side to thereby lift the ram 62. An intermediate position for this double action operation is also shown in FIG. 5 in the intermediate dotted position for the platform 60 and the associated structure. Finally, as the platform 60 is lifted to its uppermost position by the screws 48 and 50, then substantially all of the belt 74 is moved around the pulley 76 so that the ram 62 will be in its uppermost position as shown in the full line position in FIG. 5.

It can be seen, therefore, that as the platform 60 is moved by the screws 48 and 50, the ram 62 is also being moved so as to provide for the double action operation and a more rapid movement of the end 22 of the ram member 62. This double action operation also has a maximum travel since the tubular followers 52 and 54 may move to essentially the complete bottom position to substantially enclose the screws 48 and 50 and with the screws being mounted substantially at the floor level and extending to the platform. This maximizes the total travel of the lifting mechanism.

In prior art devices, the motor is generally mounted at the floor level and points upward with the gearing at the top and thereby forshortens the length of the screw and follower structure. The present invention mounts the motor perpendicular to the direction of travel of the lifting mechanism to thereby increase the length of the screw members and followers for a given height of the platform above floor level to thereby maximizing the travel. The double acting ram, of course, additionally enhances the travel motion of the lifting mechanism of the present invention.

As a further improvement in the lifting mechanism of the present invention, a second ram member is provided at a back position to further enhance the stability of the platform 60 to in turn enhance the stability of the entire lifting mechanism. The additional ram is shown as ram member 82 and is received within a rearward support 84, as shown in FIG. 5. The second ram member 82 is also attached to its upper end to the platform 60 and with the second ram member 82 also formed as a hexagonal structure. The second ram 82 has upper and lower bearing members generally designated as bearing members 86 in FIGS. 2 and 5. The bearing member 86 provide for bearing support of the ram member 82 as it is moved upward and downward in accordance with movement of the platform 60. The use of the dual screw and dual rams for the lifting mechanism of the present invention thereby provides for enhanced stability.

The present invention, therefore, provides for a lifting mechanism for a structure such as a chair which lifting mechanism has enhanced travel, rapid travel and enhanced stability. Although the invention has been described with reference to a particular embodiment, it should be appreciated that other adaptations and modifications may be made and the invention is only to be limited by the appended claims.

I claim:

1. A lifting mechanism for providing a vertical movement relative to a floor, including, a platform movable in a vertical direction between a first lower position above the floor and a second higher position above the floor, a motor located between the floor and the platform, and including a drive shaft extending along a horizontal axis for providing a rotary motion of the drive shaft, at least one axial drive means coupled to the platform and extending between the floor and the platform for providing movement of the platform in the vertical direction, intermediary gear means coupled to the drive shaft of the motor and to the axial drive means for translating the rotary motion of the drive shaft in the horizontal direction to the motion of the axial drive means in the vertical direction, a ram member movable vertically with the platform and having an external configuration defined by a plurality of planar vertical surfaces, bearings disposed against at least some of the planar surfaces of the ram member and coupled to the platform for guiding the vertical movement of the ram member, and pulley means responsive to the vertical movement of the platform for providing an additional vertical movement of the ram member in accordance with the vertical movement of the platform.

2. The lifting mechanism of claim 1 including at least a pair of axial drive means coupled to the platform at spaced positions in the horizontal direction for enhancing the stability of the platform.

3. The lifting mechanism of claim 1 wherein the axial drive means includes an elongated screw and a follower.

4. The lifting mechanism of claim 3 wherein the follower is formed by a tubular member with an internal thread, the tubular member substantially enclosing the elongated screw with the platform in the lower position and small portion of the elongated screw extending from, and coupled to, the gear means with the platform in the lower position.

5. The lifting mechanism of claim 3 wherein the gear means is coupled to the axial drive member by a belt and pulley arrangement and wherein pulleys are mounted to the gear means and the elongated screw and the belt interconnecting the pulleys.

6. The lifting mechanism of claim 5 wherein the axial drive means is formed by two drive members and two spaced elongated screws and followers and wherein pulleys are coupled to the screws and wherein the belt interconnects the pulleys so that both spaced screws and followers act simultaneously.

7. The lifting mechanism of claim 5 wherein the belt is formed as a chain and the pulleys are formed as toothed wheels.

8. The lifting mechanism of claim 1 additionally including a second movable ram member movably mounted on the platform for axial movement relative to the platform and the vertical movement of the platform provides a simultaneous vertical movement of the second ram member with the first ram member.

9. The lifting mechanism of claim 1 additionally including a pulley mounted on the platform and a belt extending around the pulley between a fixed location and the movable ram so that, as the platform is moved vertical, the belt moves around the pulley to move the ram vertically relative to the platform.

10. The lifting mechanism of claim 8 additionally including an additional movable ram member and a slidable support, the additional ram member and the slidable support being horizontally spaced from the first ram member, the additional ram member being flexibly attached at one end to the platform and being received within the slidable support for slidable movement of the additional ram vertically with the first ram member during the movement of the platform for enhancing the stability of the ram member.

11. The lifting mechanism of claim 1 additionally including an adjustable chair mounted on the platform.

12. A lifting mechanism as set forth in claim 1 wherein the ram member has a plurality of surfaces defining a hexagonal configuration in horizontal section and the bearings are disposed against alternate ones of the hexagonal surfaces defining the configuration of the ram member in horizontal section.

13. A lifting mechanism for providing a vertical movement relative to a floor, including, a platform movable in a vertical direction between a first lower position and a second higher position, a motor including a drive shaft extending along a substantially horizontal axis for providing a rotary motion of the drive shaft, at least one axial drive means coupled to the platform and extending in a vertical direction for providing a movement of the platform in the vertical direction, gear means coupled to the drive shaft of the motor and to the axial drive means for traslating the rotary motion of the drive shaft on the horizontal axis to motion of the axial drive means in the vertical direction to provide the movement of the platform in the vertical direction, a movable ram member supported on the platform and movable relative to the platform in the vertical direction, means associated with the ram member and the platform for producing a movement of the ram member in the vertical direction in accordance with the movement of the platform in the vertical direction to produce a double action movement of the ram member in the vertical direction upon rotation of the motor, the ram member having a plurality of planar side surfaces, and bearing disposed in abutting relationship with at least some of the planar side surfaces of the ram member to provide the ram member with a firm support as the ram member moves upwardly.

14. The lifting mechanism of claim 13 including at least second axial drive means coupled to the platform at a spaced position from the first axial drive means for enhancing the stability of the platform and at least second gear means coupled to the drive shaft of the motor and to the second axial drive means and spaced from the first gear means for traslating the rotary motion of the drive shaft in the horizontal direction to a translation of the second axial drive means in the vertical direction.

15. The lifting mechanism of claim 13 wherein the axial drive means includes an elongated screw and a follower and wherein a chair is coupled to the ram member.

16. The lifting mechanism of claim 15 wherein the follower is formed by a tubular member with an internal thread, the tubular member substantially enclosing the elongated screw with the platform in the lower position, a small portion of the elongated screw extending from and coupled to the gear means with the platform in the lower position.

17. The lifting mechanism of claim 15 wherein the gear means is coupled to the axial drive means with a belt and pulley arrangement wherein pulleys are mounted to the gear means and the elongated screw and wherein the belt interconects the pulleys.

18. The lifting mechanism of claim 17 wherein a second ram member is displaced horizontally from the first member and is provided with a plurality of planar side surfaces and is movable vertically with the platform and second bearing are disposed against at least some of the planar surfaces of the second ram member and are coupled to the platform for guiding the vertical movement of the second ram member.

19. The lifting mechanism of claim 17 wherein the means providing the movement of the ram member includes a pulley affixed to the platform and a belt to the ram member and at the other end to a fixed support so that, coupled to the pulley and attached at one end as the platform is moved, the belt moves around the pulley to move the ram member vertically relative to the platform.

20. The lifting mechanism of claim 18 additionally including a pair of pulleys each mounted on the platform and a pair of belts each extending around an associated one of the pulleys between a fixed location and an associated one of the movable rams so that, as the platform is moved, each belt moves around the associated pulley to move the associated ram vertically relative to the platform.

21. The lifting mechanism of claim 20 additionally including at least second axial drive means coupled to the platform at a spaced position from the first axial drive means for enhancing the stability of the platform and at least second gear means coupled to the drive shaft of the motor and to the second axial drive means and spaced from the first gear means for translating the rotary motion of the drive shaft in the horizontal direction to a translation of the second axial drive means in the vertical direction.

22. The lifting mechanism of claim 1 additionally including an adjustable chair mounted on the platform.

23. A lifting mechanism as set forth in claim 13 wherein the ram member has a plurality of surfaces defining a hexagonal configuration in horizontal section and the bearings are disposed against alternate ones of the hexagonal surfaces defining the configuration of the ram member in horizontal section.

* * * * *